(No Model.)

W. P. KOOKOGEY.
MEANS FOR MEASURING AND REGULATING THE CHARGE AND DISCHARGE OF SECONDARY BATTERIES.

No. 408,112. Patented July 30, 1889.

WITNESSES:

INVENTOR:

UNITED STATES PATENT OFFICE.

WILLIAM P. KOOKOGEY, OF BROOKLYN, NEW YORK.

MEANS FOR MEASURING AND REGULATING THE CHARGE AND DISCHARGE OF SECONDARY BATTERIES.

SPECIFICATION forming part of Letters Patent No. 408,112, dated July 30, 1889.

Application filed July 5, 1888. Serial No. 279,110. (No model.)

*To all whom it may concern:*

Be it known that I, WILLIAM P. KOOKOGEY, of Brooklyn, in the State of New York, have invented a new and useful Means for Measuring and Regulating the Charge and Discharge of Storage-Batteries, of which the following is a specification.

My invention relates to means for automatically breaking the circuit passing from the generator to a storage-battery at a predetermined charge without disturbing its connection with the working-circuit. Its object is to automatically stop the operation of charge at the moment when complete, and thus prevent waste of power and unnecessary expense.

It consists, in general, of the introduction into the charging and working circuits of an electro-depositing cell, one of the plates of which is attached to one end of a balance-beam and movable under the influence of gravity, the other end of the balance-beam operating circuit-connections in the charging-circuit, the charging-current passing through the depositing-cell in one direction and the discharging-current in the opposite direction. When the movable plate, by the deposition of metal upon it through the action of the charging-current, has reached a certain predetermined weight, that end of the balance-beam descends, and thereby opens the charging-circuit at the other end of the beam. The discharging-current as soon as the working-line is closed then passes through the depositing-cell in the opposite direction, and the metal is removed from the movable plate. The working-circuit is not opened by the action of the balance.

Figure 1:
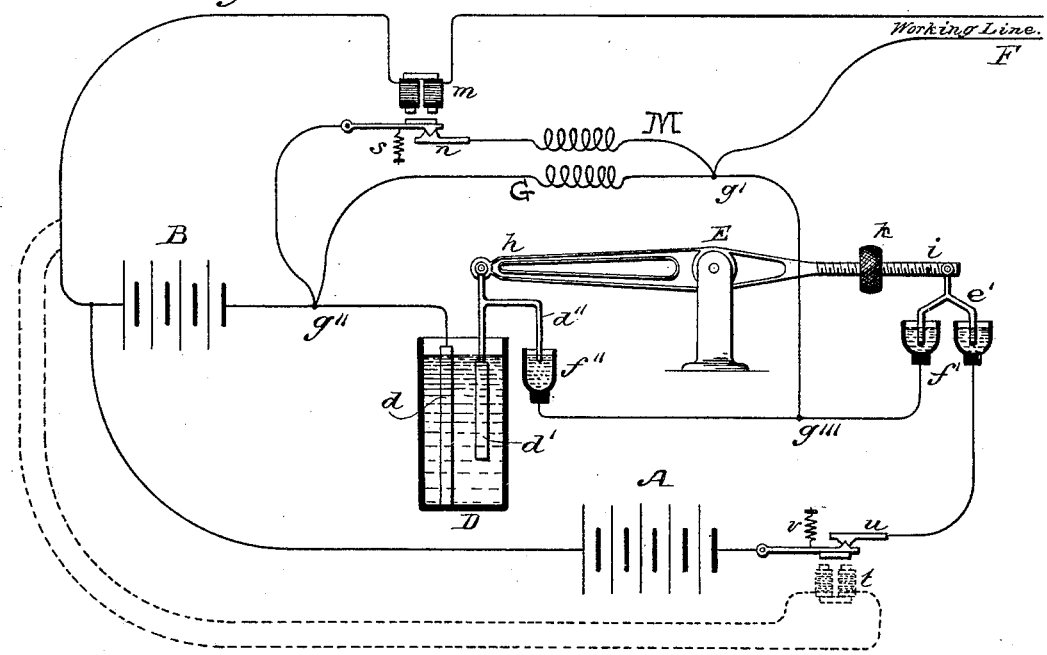
Figure 2:
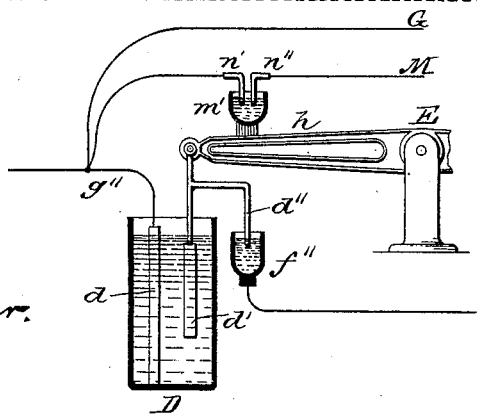

In the accompanying drawings, in which the same letters of reference indicate analogous parts, Figure 1 is a diagram illustrating the principle of the invention, and Fig. 2 represents a modification of the compensating shunt.

A is the generator or charging source, such as a dynamo-machine or galvanic battery.

B is a storage-battery to be charged from the generator A.

D is the electro-depositing cell, and E the balance.

Within the cell D are two plates, one $d$ being stationary and electrically connected with the storage-battery B, and the other $d'$ being movable and attached mechanically and electrically to one end of the beam of the balance E. At the other end of the balance E is a circuit-closer, consisting of a forked rod $e'$ dipping into mercury-cups $f'$, arranged, when connected by the immersion of the forked rod $e'$ in the mercury, to form a part of the charging-circuit.

In the position shown in Fig. 1 the circuit is complete and the storage-battery B may be charged, during which operation metal is deposited upon the plate $d'$. The balance-beam of the balance E and the parts depending from it are to be so balanced that after a certain predetermined amount of metal has been deposited upon the plate $d'$ it will descend by gravity and thus break the charging-circuit at the cup $f$. As the weight of metal deposited bears a fixed relation to the current passing through the cell, this serves as an accurate measurement of the amount of charge.

Different kinds of elements and of solution may be used in the cell D. As the best method I contemplate having the elements of copper in a solution of sulphate of copper. One or both of the elements may be movable. The internal resistance of the cell D should be made as low as possible.

F is a circuit arranged for work—*e. g.*, a series of lamps.

G is a shunt calculated to carry any predetermined portion of the current, so that only a certain portion shall pass through the cell D, it being undesirable to pass all the current through the cell. The shunt G operates whether the storage-battery B is charging or discharging, the current dividing at $g''$ during the charge and at $g'$ during the discharge. The balance E in Fig. 1 may or may not form part of the path of the current. Another path is shown affording better connections through the conductor $d''$ and the mercury-cup $f''$, (the conductor $d''$ being immersed in the mercury in all positions of the balance.) From this there is connection with the working-circuit at $g'''$ and with the charging-circuit by means of the forked conductor $e'$, whose ends dip into separate mercury-cups $f'$. By means of the weight $k$, screwing upon one arm of the balance E, adjustment of the balance may be made, in order to meet varied conditions of the generator and the storage-battery—such as, e. g., a larger number of cells to be charged. M is an additional shunt to compensate for loss of power, whose purpose will be explained farther on.

The operation is as follows, (supposing for the present that the shunt M is not there:) The parts are in the position ready to charge, and the working-circuit is supposed to be open. The charging-current will therefore pass from generator A through battery B; then dividing at $g''$, a certain part through cell D, and the remainder through shunt G, the two portions uniting at the point $g'''$, and passing thence through cups $f'$ and conductor $e'$ back to the generator A. When the predetermined amount of charge has been made, the plate $d'$ descends, the conductor $e'$ leaves the cups $f'$, and the charging-circuit is broken. In discharging the current passes from the battery B through the working-circuit to the point $g'$, where it divides, one part going through the shunt G and the remainder through the cell D back to the battery B. During this operation, the current being reversed, the reverse operation takes place in the cell D, and the plate $d'$ loses again what was deposited upon it, and this continues as long as the working-circuit is closed, the amount removed from the plate $d'$ bearing the same relation to the discharging-current as the amount deposited did to the charging. In other words, the cell D acts as an automatic regulator, permitting the generator to be in circuit just long enough to supply the energy which has been used, and no longer, whatever quantity may have been used. Since the plate $d'$ descends as soon as it acquires weight enough, any decrease of that weight will cause it to ascend, and therefore it ascends almost immediately after the reverse (i. e., the working-current) is started. The effect of this is to again start the charging-current, and both would be operating together. Whenever this is undesirable, it may be avoided by arranging a break in the charging-circuit to be operated by the working-circuit. This is shown in the circuit-breaker $u$, operated by the magnet $t$, which leads from the working-line, and by the spring $v$, which is designed to hold the circuit-breaker $u$ in position to close the charging-circuit whenever the magnet $t$ is not energized—i. e., whenever the working-circuit is open.

This invention is susceptible of a most important use when used in connection with a system by which the storage-battery is automatically connected with the charging-circuit by the mere opening of the working-circuit and with the working-circuit by the mere closing of the working-circuit. Such a system is shown in an application filed by me June 11, 1888, for apparatus and connections for charging and discharging storage-batteries, Serial No. 276,774.

By the combined use of that invention and this one a system is obtained in which a storage-battery automatically connects with its charging source as soon as its work ceases— e. g., its last light is turned out—is automatically disconnected from the charging source as soon as a full charge has been received, and is automatically connected with the working-line at any time by merely starting the work—e. g., the turning on of a lamp.

In the use of storage-batteries there is a loss by local action, and they return less current than they receive. Unless this is allowed for in some way more metal will be deposited upon the plate $d'$ during the charge than is removed during the discharge, and this will soon render the balance incorrect. This compensation might be made by moving the weight $k$ after each discharge, but the addition of the shunt M does it automatically. The idea of the shunt M is that it shall be in circuit during the charge and out of circuit during the discharge, so that all the discharging-current shall pass through the cell D and the shunt G, but during the charge enough shall be taken by the shunt M to balance the difference between the charging and discharging currents through the cell D.

By regulating the relative resistances of the shunts M and G the same amount of current may be made to pass through the cell D in one direction as in the other. Thus, e. g., if the loss by local action be about one-tenth of the current stored and the sum of the three resistances of the cell D, the shunt G, and the shunt M between the points $g''$ and $g'''$ should be .100 of an ohm, and the separate resistance of the cell D and its connections should be .080 of an ohm; then the shunt M should have a resistance of .013 of an ohm and the shunt G a resistance of .007 of an ohm.

It is evident that the principle of the compensating shunt M is equally applicable where all the current is passed through the cell D instead of some part through the shunt G.

In Fig. 2, which illustrates another method of using the compensating shunt, $n'$ and $n''$ are stationary pieces whose ends dip into the insulated mercury-cup $m'$, which is fixed on the end of the balance E. Through them the shunt M is kept in circuit during the charge, and is cut out when the charge is complete by the falling of the end $h$ of the balance E; but in this case the relative resistance of the shunt M would have to differ from that in Fig. 1, inasmuch as the shunt M would be out of circuit only at the beginning of the discharge and for a short time.

The main idea of this invention is the use of the principle of the electro-depositing cell in combination with suitable mechanism to transmit the motion caused by the variations of weight in the elements of the cell under the operation of the current, in order to stop the charging of a storage-battery at a predetermined point without disturbing its connection with the working-circuit. I know of no prior use of this principle for that purpose. The balance is but one convenient form of mechanism for transmitting the motion.

I know it is not new to use the electrolytic action of an electro-depositing cell to connect a storage-battery alternately with the charging source and the working-line by means of a balance operating at one end a circuit-breaker in the charging-circuit and at the other end a circuit-breaker in the working-circuit; nor is it broadly new to use electrolytic action to break the charging-circuit after a given charge. I do not, therefore, claim those matters.

I claim as my invention—

1. The combination of the following elements: a charging-circuit, a storage-battery, a working-circuit, an electro-depositing cell forming part of both the working-circuit and of the charging-circuit and having one plate movable, and a balance attached at one end to the movable plate and actuating at its other end circuit-connections in the charging-circuit, and a permanent connection between the cell and the working-circuit, substantially as described.

2. The combination of the following elements: a charging-circuit, a storage-battery, a working-circuit, an electro-depositing cell forming part of both the working-circuit and of the charging-circuit and having one plate movable, a balance attached at one end to the movable plate and actuating at its other end circuit-connections in the charging-circuit, and a compensating shunt with a circuit-breaker, such shunt passing around the electro-depositing cell, taking such proportion of the charging-current as will balance the loss by local action in the storage-battery during the discharge, substantially as and for the purpose described.

In witness whereof I have hereunto subscribed my name, in the presence of two witnesses, this 2d day of July, 1888.

WM. P. KOOKOGEY.

Witnesses:
   GEO. C. BRAINERD,
   FRANK FISCHER.